US010563351B2

(12) United States Patent
Murayama et al.

(10) Patent No.: US 10,563,351 B2
(45) Date of Patent: Feb. 18, 2020

(54) SHEET MANUFACTURING APPARATUS AND MATERIAL DEFIBRATING APPARATUS

(71) Applicant: SEIKO EPSON CORPORATION, Tokyo (JP)

(72) Inventors: Yoshiaki Murayama, Nagano (JP); Nobumasa Abe, Nagano (JP); Toshiaki Yamagami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 15/103,520

(22) PCT Filed: Sep. 26, 2014

(86) PCT No.: PCT/JP2014/004952
§ 371 (c)(1),
(2) Date: Jun. 10, 2016

(87) PCT Pub. No.: WO2015/121903
PCT Pub. Date: Aug. 20, 2015

(65) Prior Publication Data
US 2016/0312405 A1    Oct. 27, 2016

(30) Foreign Application Priority Data

Feb. 14, 2014   (JP) ................................ 2014-026327

(51) Int. Cl.
*B27N 3/04* (2006.01)
*D21B 1/10* (2006.01)
(Continued)

(52) U.S. Cl.
CPC ................ *D21B 1/10* (2013.01); *B27N 3/04* (2013.01); *D21B 1/06* (2013.01); *D21H 17/20* (2013.01); *Y02W 30/644* (2015.05)

(58) Field of Classification Search
CPC ................................... B27N 3/04; D21B 1/10
See application file for complete search history.

(56) References Cited

U.S. PATENT DOCUMENTS

| 4,382,559 | A | * | 5/1983 | Hellberg | .................. D21B 1/30 |
| | | | | | 241/79.3 |
| 4,867,383 | A | | 9/1989 | Terry et al. | |

(Continued)

FOREIGN PATENT DOCUMENTS

| JP | 03-279456 A | 12/1991 |
| JP | 11-293578 A | 10/1999 |

(Continued)

OTHER PUBLICATIONS

The Extended European Search Report for the corresponding European Patent Application No. 14882339.6 dated Aug. 14, 2017.

*Primary Examiner* — Ryan M Ochylski
(74) *Attorney, Agent, or Firm* — Global IP Counselors, LLP

(57) ABSTRACT

An apparatus reduces material left between a shredding unit and a defibrating unit. A sheet manufacturing apparatus including a shredder that separates feedstock containing at least fiber into shreds in air; a defibrating unit that defibrates at least the shreds in air; and a forming unit that forms a sheet using defibrated material defibrated by the defibrating unit; wherein the defibration capacity, which is the amount defibrated per unit time by the defibrating unit, is greater than or equal to the shredding capacity, which is the amount shredded per unit time by the shredder.

3 Claims, 1 Drawing Sheet

(51) Int. Cl.
    *D21B 1/06*     (2006.01)
    *D21H 17/20*     (2006.01)

(56) References Cited

U.S. PATENT DOCUMENTS

| | | | |
|---|---|---|---|
| 7,134,859 B1 * | 11/2006 | Sorensen | D21B 1/06 425/82.1 |
| 8,882,965 B2 | 11/2014 | Yamagami et al. | |
| 9,194,081 B2 | 11/2015 | Yamagami | |
| 2014/0027075 A1 | 1/2014 | Yamagami et al. | |

FOREIGN PATENT DOCUMENTS

| | | |
|---|---|---|
| JP | 2012-144819 A | 8/2012 |
| JP | 2012-144826 A | 8/2012 |
| WO | 2011/107476 A2 | 9/2011 |

* cited by examiner

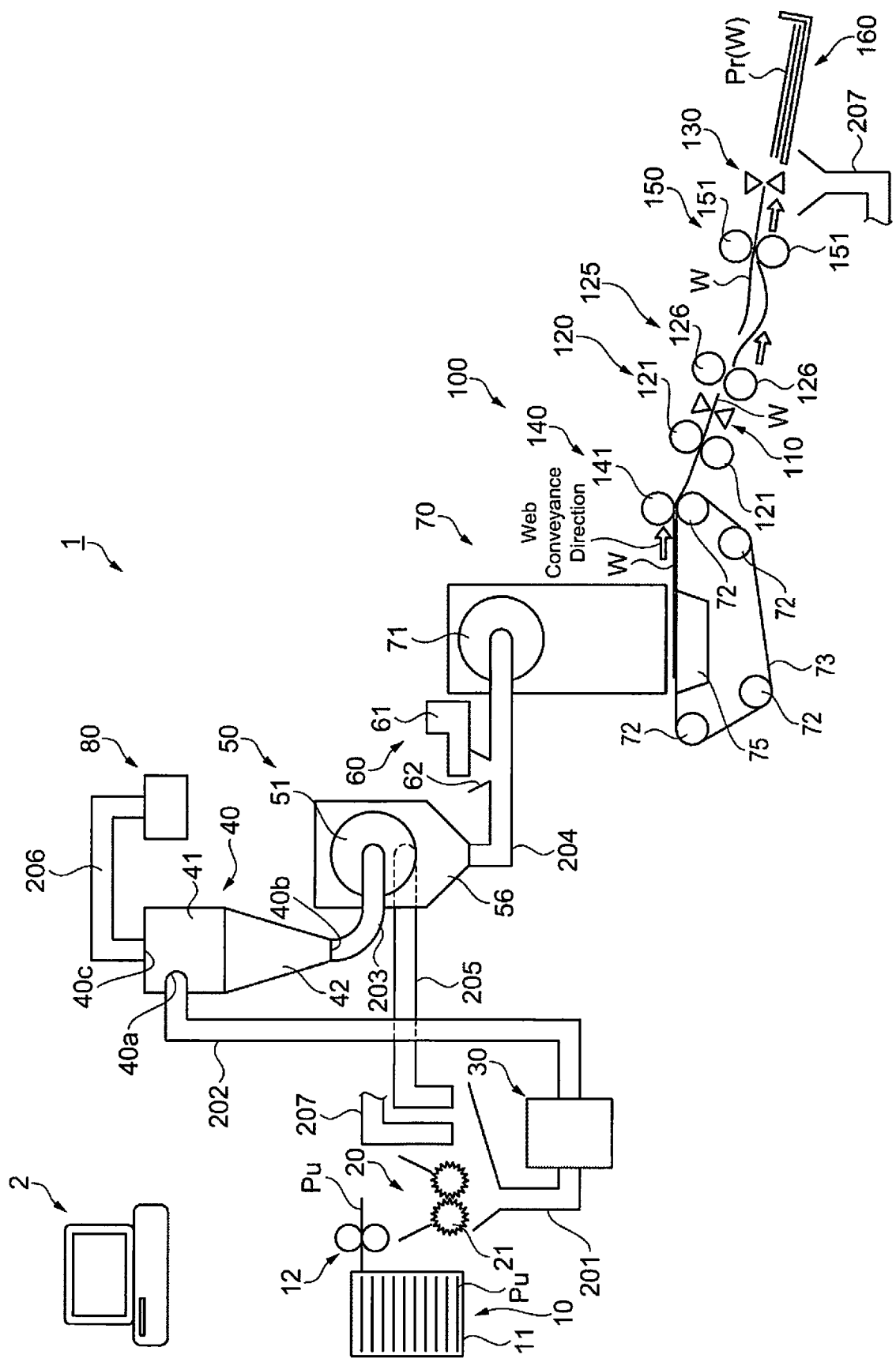

SHEET MANUFACTURING APPARATUS AND MATERIAL DEFIBRATING APPARATUS

TECHNICAL FIELD

The present invention relates to a sheet manufacturing apparatus and a material defibrating apparatus.

BACKGROUND

A paper recycling system having a dry defibrating unit that shreds recovered paper loaded into a shredder and defibrates the shredded paper, a first conveyance unit that conveys the defibrated material output by the dry defibrating unit, an air classifier that separates and deinks the defibrated material conveyed by the first conveyance unit, a second conveyance unit that conveys the defibrated material de-inked by the classifier, and a paper-forming unit that produces paper from the defibrated material conveyed by the second conveyance unit is known from the literature. (See, for example, PTL 1.)

CITATION LIST

Patent Literature

[PTL 1] JP-A-2012-144819

SUMMARY OF INVENTION

Technical Problem

However, if the amount processed by the shredder is greater than the amount processed by the dry defibrating unit, shredded material may accumulate in the defibrating unit and may not be defibrated.

Solution to Problem

The present invention is directed to solving at least part of the foregoing problem, and can be achieved by the embodiments or examples described below.

[Example 1] A sheet manufacturing apparatus according to this example is a sheet manufacturing apparatus including: a shredder that separates feedstock containing at least fiber into shreds in air; a defibrating unit that defibrates at least the shreds in air; and a forming unit that forms a sheet using defibrated material defibrated by the defibrating unit; wherein the defibration capacity, which is the amount defibrated per unit time by the defibrating unit, is greater than or equal to the shredding capacity, which is the amount shredded per unit time by the shredder.

Because the defibration capacity is greater than or equal to the shredding capacity in this configuration, leaving shreds in the defibrating unit is suppressed and deficient defibration can be prevented.

[Example 2] A sheet manufacturing apparatus according to the foregoing example, further comprising a separator that separates the defibrated material into passed material that passes through multiple apertures, and remnants that do not pass; and a first conveyance path that conveys the remnants to the defibrating unit; the defibration capacity being greater than or equal to the sum of the amount passing through the first conveyance path per unit time and the shredding capacity.

Thus comprised, feedstock is not left behind even if shredded material is mixed through the first conveyance path from the separator because the processing capacity of the defibrating unit is greater.

[Example 3] A sheet manufacturing apparatus according to the foregoing example, further comprising a cutting unit that cuts the sheet; and a second conveyance path that conveys trimmings from cutting by the cutting unit; the defibration capacity being greater than or equal to the sum of the amount passing through the second conveyance path per unit time and the shredding capacity.

Thus comprised, feedstock is not left behind even if trimmings produced in the cutting unit are mixed through the conveyance path with the shreds because the processing capacity of the defibrating unit is greater.

[Example 4] A feedstock defibrating apparatus according to another aspect of the invention has a shredder that separates feedstock containing at least fiber into shreds in air; and a defibrating unit that defibrates the shreds in air; wherein the defibration amount processed per unit time by the defibrating unit is greater than or equal to the shredding amount processed per unit time by the shredder.

Because the defibration capacity is greater than or equal to the shredding capacity in this configuration, shreds being left in the defibrating unit or the conveyance path between the shredder and the defibrating unit is suppressed and deficient defibration can be prevented.

BRIEF DESCRIPTION OF DRAWINGS

FIG. 1 schematically illustrates the configuration of a sheet manufacturing apparatus.

DESCRIPTION OF EMBODIMENTS

A preferred embodiment of the invention is described below with reference to the accompanying figures. Note that parts are shown in the accompanying figures in sizes enabling easy recognition thereof, and differ from the actual scale of the actual parts.

The configuration of the sheet manufacturing apparatus and a sheet manufacturing method are described first below. The sheet manufacturing apparatus is based on technology for forming a new sheet Pr from feedstock Pu (material to be defibrated) such as virgin pulp paper and recovered paper. The sheet manufacturing apparatus is a sheet manufacturing apparatus including a shredding unit that breaks material containing at least fiber into small shreds in air; a defibrating unit that defibrates the shreds in air; and a forming unit that forms a sheet using the defibrated material defibrated by the defibrating unit; and is characterized by the defibrated amount of material defibrated per unit time by the defibrating unit being greater than or equal to the shredded amount of material shredded per unit time by the shredder. This is described more specifically below. 1

FIG. 1 schematically illustrates the configuration of a sheet manufacturing apparatus according to this embodiment. As shown in FIG. 1, the sheet manufacturing apparatus 1 according to this embodiment has a supply unit 10, a shredder 20, a defibrating unit 30, a classifier 40, a separator 50, an additive agent feed unit 60, a forming unit 70, a conveyance unit 100, a first cutting unit 110, a second cutting unit 130 as another cutting unit, and a fuser unit 150. The sheet manufacturing apparatus 1 also has a control unit 2 that controls these other parts.

The supply unit 10 supplies recovered paper Pu to the shredder 20. The supply unit 10 includes a tray 11 for stocking a stack of sheets of recovered paper Pu, and an automatic sheet feeder 12 for continuously supplying the recovered paper Pu in the tray 11 to the shredder 20. A4 office paper such as typically used in business is an example of the recovered paper Pu that is supplied to the sheet manufacturing apparatus 1.

The shredder 20 cuts the supplied recovered paper Pu into shreds a few centimeter square. The shredder 20 has shredder blades 21, and is configured similarly to a common office shredder but with a wider shredding width. This enables easily cutting the recovered paper Pu that is supplied into small shreds. The shredded material is then conveyed through a pipe 201 to the defibrating unit 30.

The diameter of the pipe 201 between the shredder 20 and the defibrating unit 30 is constant (uniform). More specifically, there are no places in which shreds output from the shredder 20 can accumulate between the shredder 20 and defibrating unit 30. Because the diameter of the pipe 201 can thus be made constant, cost is low and less space is required.

The defibrating unit 30 has a rotor (not shown in the figure) that turns, and defibrates and separates the shredded paper into fibers by the shredded paper supplied from the shredder 20 colliding with the rotor. Note that the defibrating unit 30 in this embodiment of the invention defibrates the shredded paper in air in a dry process. As a result of the defibration process of the defibrating unit 30, ink and toner used for printing, sizing agents, and other coating materials applied to the paper are reduced to particulate several ten microns or less in diameter (referred to below as "ink particles"), and separated from the fibers. The defibrated material output from the defibrating unit 30 is thus the fibers and ink particles obtained by defibration of the shredded paper. The defibrating unit 30 also produces an air current by rotation of the rotor, and the defibrated fiber is conveyed by this air current through a pipe 202 to the classifier 40. Note that a blower for producing an air current to carry defibrated fiber through the pipe 202 to the classifier 40 may be separately attached to the defibrating unit 30 as needed.

The defibrating unit 30 is a mechanism that produces an air current by rotation of the rotor blades, and defibrated material is carried by the air current through the pipe 202 and conveyed to the classifier 40. If a dry defibrating unit 30 without an air blower mechanism is used, a separate blower that produces an air flow from the shredder 20 to the defibrating unit 30 may be added.

The classifier 40 separates material introduced thereto by an air flow process. In this embodiment of the invention, defibrated material is introduced, and is separated into ink particles and fiber. By using a cyclone unit, the classifier 40 can separate the conveyed fiber into ink particles and deinked fibers (deinked defibrated material) by an air classification process. Note that an air classifier other than a cyclone separator may be used. In this event, an elbow-jet or eddy classifier, for example, may be used as an air classifier instead of a cyclone. An air classifier produces a helical airflow, and separates and classifies by means of the differences in centrifugal force resulting from the size and density of the defibrated material, and the cut point can be adjusted by adjusting the speed of the air flow and the centrifugal force. As a result, relatively small, relatively low density ink particles can be separated from the fibers that are larger and more dense than the ink particles. Removing the ink particles from the fibers is referred to as "deinking."

The classifier 40 in this embodiment of the invention is a tangential inlet cyclone, and has an inlet port 40a from the defibrating unit 30; a cylindrical cyclone body 41 to which the inlet port 40a is tangentially attached; a conical section 42 continuing from the bottom of the cyclone body 41; a lower discharge port 40b disposed to the bottom of the conical section 42; and an upper discharge port 40c disposed to the top center of the cyclone body 41 for discharging fine particulate. The diameter of the conical section 42 decreases from top to bottom.

In the classification process, the air flow carrying the defibrated material introduced from the inlet port 40a of the classifier 40 is converted by the cyclone body 41 and conical section 42 to a circular motion, and the material is classified by centrifugal force. Deinking progresses as fiber, which is larger and more dense than the ink particles, moves to the lower discharge port 40b, and ink particles, which are relatively small and low density, rise as fine particulate with air to the upper discharge port 40c. The discharged short fiber mixture containing a large amount of ink particles is then discharged from the upper discharge port 40c of the classifier 40. The discharged short fiber mixture containing a large amount of ink particles is then recovered through a pipe 206 connected to the upper discharge port 40c of the classifier 40 into the receiver 80. The classified material containing the separated fiber is then conveyed by air from the lower discharge port 40b of the classifier 40 through the pipe 203 to the separator 50. Conveyance from the classifier 40 to the separator 50 may be by the air current from classification, or by gravity from the classifier 40 above to the separator 50 below. Note also that a suction device for efficiently suctioning the short fiber mix from the upper discharge port 40c may be disposed to the upper discharge port 40c of the classifier 40 or the pipe 206, for example.

The separator 50 selectively passes the classified material including fibers classified by the classifier 40 through numerous apertures in a drum unit 51. More specifically, the separator 50 separates the classified material including fiber that was classified by the classifier 40 into passed material that passes through the apertures, and remnants that do not pass through. The passed material is primarily fiber of a size that can pass through the apertures. The remnants are non-defibrated shreds that were not broken down into individual fibers, fiber lumps of interlocked fibers, and fibers that are too long to pass through the apertures. The separator 50 in this embodiment of the invention uses a mechanism that disperses the classified material into air by a rotary movement. The passed material that past the apertures by the separation process of the separator 50 are received into a hopper 56 and then conveyed through a pipe 204 to the forming unit 70. The remnants that did not pass through the apertures in the separation process of the separator 50 are returned as recovered material to be defibrated again through a pipe 205 as a first conveyance path. The remnants are material that cannot pass through the apertures, and are defibrated again by the defibrating unit 30 to be able to pass through the apertures. As a result, the remnants are recycled (reused) instead of being discarded as waste.

The passed material that past through the apertures in the separation process of the separator 50 is conveyed by air through the pipe 204 to the forming unit 70. Material may be conveyed by a blower not shown that produces an air flow from the separator 50 to the forming unit 70, or be conveyed by gravity from the separator 50 above to the forming unit 70 below. An additive agent feed unit 60 for adding an additive such as a resin (a fusion bonding resin or thermosetting resin, for example) to the conveyed passed material is also disposed to the pipe 204 between the separator 50 and the forming unit 70. In addition to fusion bonding resin, additives such as flame retardants, bleaching agents, paper strengtheners, and sizing agents may also be added. These additives are stored in an additive hopper 61 and introduced through a loading port 62 by a loader mechanism not shown.

The forming unit 70 deposits material including the passed material containing fiber and resin introduced from the pipe 204 and forms a web. The forming unit 70 includes a mechanism that uniformly disperses fiber in air, and a mechanism that lays the dispersed fiber onto a mesh belt 73.

A forming drum 71 into which fiber and resin is loaded is disposed to the forming unit 70 as the mechanism for uniformly distributing the fiber in air. By rotationally driving the forming drum 71, the resin (additive) can be uniformly mixed with the passedmaterial (fiber). A foraminous screen is disposed to the forming drum 71. By rotationally driving the forming drum 71, resin (additive) can be uniformly mixed with the passed material (fiber), and a mixture of resin and fibers that past the apertures in the screen can be uniformly distributed in air.

An endless mesh belt 73 made with mesh and tensioned by tension rollers 72 is disposed below the forming unit 70. The mesh belt 73 moves in one direction by at least one of the tension rollers 72 turning.

A suction device 75 that produces a downward flow of air through the mesh belt 73 is disposed as a suction unit below the forming drum 71 with the mesh belt 73 therebetween. The suction device 75 pulls the fibers suspended in air down onto the mesh belt 73.

The fiber and other materials that past through the foraminous screen of the forming drum 71 is deposited onto the mesh belt 73 by the suction power of the suction device 75. By moving the mesh belt 73 in one direction, the fibers and resin can be deposited to form a continuous web W. A web W containing continuously deposited fiber and resin can be formed by moving the mesh belt 73 in one direction. A web W formed in a continuous ribbon is formed by continuous distribution from the forming drum 71 and movement of the mesh belt 73. Note that the mesh belt 73 may be made of metal, plastic, or nonwoven cloth, and may be configured in any way enabling fibers to accumulate thereon and air to pass therethrough. Note that if the size of the mesh in the mesh belt 73 is too large, fibers may enter the mesh and create irregularities in the formed web (sheet), and if the mesh is too small, it is difficult for the suction device 75 to maintain a stable air flow. As a result, the size of the mesh is preferably adjusted appropriately. The suction device 75 can be constructed by forming an air-tight box with a window of a desirable size below the mesh belt 73, and pulling air in through the window so that the pressure inside the box is lower than the ambient pressure. Note that a web W according to this embodiment of the invention refers to the configuration of an object containing fibers and resin. The web W is therefore still referred to as a web W even if the size or other aspect of its form changes by heating, compressing, cutting, conveying or other manipulation of the web W.

The web W formed on the mesh belt 73 is conveyed by the conveyance unit 100. The conveyance unit 100 in this embodiment is the part that conveys the web W from the mesh belt 73 to final deposition as a sheet Pr (web W) in the stacker 160. In addition to the mesh belt 73, various rollers therefore also function as part of the conveyance unit 100. The conveyance unit many be variously configured with at least one conveyor belt or conveyance roller. More specifically, the web W formed on the mesh belt 73, which is part of the conveyance unit 100, is conveyed in the conveyance direction (indicated by the arrow in the figures) by rotational movement of the mesh belt 73.

A compression unit is disposed on the downstream side of the forming unit 70 in the conveyance direction of the web W. The compression unit in this embodiment of the invention is a compression unit 140 comprising a roller 141 that applies pressure to the web W. The web W can be compressed by passing the web W between the mesh belt 73 and the roller 141. As a result, the strength of the web W can be improved.

A pre-cutter roller 120 is disposed on the downstream side of the compression unit 140 in the conveyance direction of the web W. The pre-cutter roller 120 comprises a pair of rollers 121. Of the rollers 121, one is the drive roller and the other is a driven roller.

A one-way clutch is used in the drive transfer unit that turns the pre-cutter roller 120. A one-way clutch has a clutch mechanism that transfers torque in only one direction, and rotates freely in the opposite direction. As a result, because the pre-cutter roller 120 rotates freely when excessive tension is applied to the web W by the speed difference between the pre-cutter roller 120 and the post-cutter roller 125, tension on the web W is suppressed, and the web W being torn can be prevented.

A first cutting unit 110 that cuts the web W transversely to the conveyance direction of the conveyed web W is disposed on the downstream side of the pre-cutter roller 120 in the conveyance direction of the web W. The first cutting unit 110 has a cutter and cuts the continuous web W into sheets according to a cutting position set to a specific length. The first cutting unit 110 may use a rotary cutter, for example. This enables cutting while conveying the web W. Productivity can therefore be improved because conveyance of the web W is not stopped for cutting. Note that the first cutting unit 110 is not limited to a rotary cutter, and other types of cutters may be used.

A post-cutter roller 125 is disposed on the downstream side of the first cutting unit 110 in the conveyance direction of the web W. The post-cutter roller 125 comprises a pair of rollers 126. Of the rollers 126, one is the drive roller and the other is a driven roller.

Tension can be applied to the web W in this embodiment of the invention by the speed difference between the pre-cutter roller 120 and the post-cutter roller 125. In this configuration, the first cutting unit 110 is driven to cut the web W while tension is applied to the web W.

A pair of fuser rollers 151 embodying a fuser unit 150 as a heating unit are disposed on the downstream side of the post-cutter roller 125 in the conveyance direction of the web W. The fuser unit 150 bonds (fuses) the fibers contained in the web W through the resin. A heater or other type of heating member is disposed in the axial center of the fuser rollers 151, and heat and pressure can be applied to the conveyed web W by passing the web W between the pair of fuser rollers 151. By applying heat and pressure to the web W with the pair of fuser rollers 151, the resin melts and becomes more easily interlaced with the fibers, the distance between fibers becomes shorter, and the number of points of contact between the fibers increases. As a result, density increases and web W strength is improved.

A second cutting unit 130 is disposed on the downstream side of the fuser unit 150 in the conveyance direction of the web W as a cutter unit that cuts the web W in the conveyance direction of the web W. The second cutting unit 130 has a cutter, and cuts at a specific cutting position in the conveyance direction of the web W. As a result, a sheet Pr (web W) of a desired size is formed. The cut sheet Pr (web W) is then stacked in a stacker 160, for example. A pipe 207 is also disposed from a position appropriate to the second cutting unit 130 to the defibrating unit 30 as a second conveyance path for returning trimmings resulting from cutting the web W with the second cutting unit 130 to the defibrating unit 30. As a result, the trimmings are returned through the pipe 207 to the defibrating unit 30 as recovered material to be defibrated and used again to make sheets. The trimmings are therefore reused (recycled) instead of being discarded as waste.

A sheet in this embodiment of the invention refers primarily to sheet products that are manufactured from feedstock containing recovered paper, virgin pulp paper, or other type of fiber. The feedstock is not so limited, however, and may be in the form of paperboard or web (or corrugated). The feedstock may also be cellulose or other type of plant fiber, synthetic fiber such as PET (polyethylene terephthalate) and polyester, or wool, silk, or other animal fiber. Sheets as referred to herein are separated into paper and nonwoven cloth. Paper includes thin sheets, recording paper for handwriting and printing, wall paper, packaging paper, color paper, and bristol paper, for example. Nonwoven cloth includes products that are thicker or have lower strength than paper, and includes nonwoven cloth, fiberboard, tissue paper, kitchen paper, cleaning paper, filter paper, liquid absorption materials, sound absorption materials, cushioning materials, and mats, for example.

Recovered paper as used in this embodiment of the invention mainly refers to paper that has been previously printed on, but any paper product that is used as feedstock is considered recovered paper whether or not the paper was actually used.

The method of driving the defibrating unit 30 is described next. The defibrating unit 30 is driven so that the defibrated amount of material defibrated per unit time by the defibrating unit 30 is greater than or equal to the amount of material shredded per unit time by the shredder 20. Shreds from the shredding process of the shredder 20 are defibrated by the defibrating unit 30. If the amount shredded is greater than the amount defibrated, shreds produced by the shredder 20 may be left in the defibrating unit 30. Shreds are defibrated by impact with the rotating rotor of the defibrating unit 30, but if the amount of shredded remnants in the defibrating unit 30 becomes too great, the force of impact drops and shreds are not sufficiently defibrated. This problem is not limited to impact mill-type defibrators, and is also true of grinding mill-type defibrators. In other words, defibration is incomplete. Incomplete defibration can be reduced if the defibration capacity of the defibrating unit 30 is greater than the shredding capacity of the shredder 20. Leaving shredded remnants in the defibrating unit 30 can also be reduced, and accumulation of shreds in the pipe 201 between the shredder 20 and defibrating unit 30 can be reduced. The amount processed per unit time as used here is the processed amount (g) divided by the processing time (s). Note that the processing time is the time required for processing, and does not include the time during which material is not processed. This may also be substituted for the amount that can be processed per unit time by the shredder 20 and the defibrating unit 30.

It is also conceivable for the shredding capacity of the shredder 20 to be greater than the defibration capacity of the defibrating unit 30, temporarily store shreds between the shredder 20 and defibrating unit 30, and feed the stored shreds to the defibrating unit 30. However, supplying a known amount of shreds to the defibrator side is extremely difficult. It is also extremely difficult in a dry system to feed a known quantity of defibrated material that has been reduced to fibers. As a result, a known amount can be fed from the supplying unit 10 to the shredder 20, and a known amount can be conveyed from the shredder 20 to the defibrating unit 30, and from the defibrating unit 30 downstream, without shreds accumulating between the shredder 20 and the defibrating unit 30.

In this embodiment of the invention as shown in FIG. 1, recovered paper Pu from the shredder 20 and remnant shreds from the separator 50 can be fed into the defibrating unit 30. Because the remnants from the separator 50 result from not being able to pass through the apertures in the separator 50, the volume is not constant and detecting the amount of remnants is difficult. The defibration capacity is therefore greater than or equal to the sum of the amount passing per unit time through the pipe 205 and the amount shredded by the shredder 20. As a result, because the defibration capacity is greater, leaving shreds in the defibrating unit 30 can be suppressed even if remnants from the separator 50 are mixed with the shreds from the shredder 20.

As shown in FIG. 1, recovered paper Pu from the shredder 20, and trimmings from the second cutting unit 130 can be fed into the defibrating unit 30 in this embodiment of the invention. The drive conditions of the defibrating unit 30 are set so that the defibration capacity is greater than or equal to the sum of the amount passing per unit time through the pipe 207 and the amount shredded by the shredder 20. As a result, remnants being left in the defibrating unit 30 can be suppressed even if trimmings from the second cutting unit 130 are mixed with the shreds from the shredder 20 because the defibration capacity is greater. Note that the drive conditions of the defibrating unit 30 may also be set so that the defibration capacity is greater than or equal to the sum of the amount passing per unit time through pipe 205, the amount passing per unit time through pipe 207, and the amount shredded by the shredder 20.

The force of the air current conveying material to the defibrating unit 30, the speed of the rotor, and other factors may also be adjusted as drive conditions of the defibrating unit 30 for setting the defibration capacity per unit time of the defibrating unit 30. For example, if Ag is the amount introduced from the shredder 20, assume 0.1 Ag is reintroduced as remnants from the separator 50. At the second cutting unit 130, 0.15 Ag is reintroduced as trimmings. In this example, therefore, the drive conditions are set so that the defibrating unit 30 can process a volume of (A+0.1 A+0.15 A) g. If the amount introduced per minute to the defibrating unit 30 is 40 to 400 g, the air flow can be adjusted between 1 $m^3$/minute to 5 $m^3$/minute. The speed of the rotor can also be adjusted to 4000 rpm to 8000 rpm. Note that the amount processed by the shredder 20 may be adjusted instead of adjusting the defibrating unit 30.

Effects of the foregoing embodiment are described below.

Because the defibration capacity of the defibrating unit 30 is greater than or equal to the shredding capacity of the shredder 20, accumulation of shreds in the defibrating unit 30 is suppressed, and defibration problems can be prevented.

The present invention is not limited to the foregoing embodiment, and the foregoing embodiment can be modified and improved in many ways. Some examples are described below.

(Example 1) In the foregoing embodiment, remnants produced in the separator 50 and trimmings produced by the second cutting unit 130 are returned to the defibrating unit 30 through the pipe 205 and pipe 207, but the invention is not so limited. A configuration omitting pipe 205 and pipe 207 is also conceivable. In this event, the configuration of the sheet manufacturing apparatus 1 can be simplified. Note that if pipe 205 and pipe 207 are eliminated, the processing capacity of the defibrating unit 30 may be reduced compared with the processing capacity when the pipe 205 and pipe 207 are included. As a result, the processing conditions of the defibrating unit 30 can be set with consideration only for the amount of shreds introduced from the shredder 20, and managing the operating conditions can be simplified.

(Example 2) The configuration of a sheet manufacturing apparatus 1 having a shredder 20, defibrating unit 30, and other components is described in the foregoing embodiment, but can also be applied to a feedstock defibrator having a shredder 20 that shreds material containing at least fiber in air, and a defibrating unit 30 that defibrates the shreds in air. In this case, the amount defibrated per unit time by the defibrating unit 30 is set greater than or equal to the amount shredded per unit time by the shredder 20. This configuration has the same effect as the embodiment described above.

(Example 3) The shredder 20 and defibrating unit 30 in the foregoing embodiment may be configured with a predetermined, constant processing capacity that cannot be adjusted. Further alternatively, the processing capacity of one of the shredder 20 and defibrating unit 30 may be adjustably controlled.

REFERENCE SIGNS LIST 1 sheet manufacturing apparatus
2 control unit
10 supply unit
20 shredder
30 defibrating unit
40 classifier
50 separator
60 additive agent feed unit
70 forming unit
80 receiver
100 conveyance unit
110 first cutting unit
120 pre-cutter roller
125 post-cutter roller
130 second cutting unit as a cutting unit
140 compression unit
150 fuser unit
160 stacker
205 pipe as a first conveyance path
207 pipe as a second conveyance path

The invention claimed is:

1. A sheet manufacturing apparatus comprising:
a shredder including blades that cut and separate feedstock containing at least fiber into shreds in air;
a defibrating unit that defibrates at least the shreds in air; and
a forming unit that forms a sheet using defibrated material defibrated by the defibrating unit;
a separator that separates the defibrated material into passed material that passes through multiple apertures, and remnants that do not pass;
a first conveyance path that conveys the remnants toward the defibrating unit; and
a pipe that is arranged downstream relative to the shredder and upstream relative to the defibrating unit in a transfer direction of the shreds and conveys both of the shreds and the remnants toward the defibrating unit, the pipe having a first end connected to the defibrating unit and a second end from which both of the shreds and the remnants enter into the pipe,
the defibration capacity, which is the amount defibrated per unit time by the defibrating unit, being greater than or equal to the shredding capacity, which is the amount shredded per unit time by the shredder,
the defibration capacity being greater than or equal to the sum of the amount passing through the first conveyance path per unit time and the shredding capacity.

2. A sheet manufacturing apparatus comprising:
a shredder including blades that cut and separate feedstock containing at least fiber into shreds in air;
a defibrating unit that defibrates at least the shreds in air; and
a forming unit that forms a sheet using defibrated material defibrated by the defibrating unit;
a cutting unit that cuts the sheet;
a second conveyance path that conveys trimmings from cutting by the cutting unit toward the defibrating unit; and
a pipe that is arranged downstream relative to the shredder and upstream relative to the defibrating unit in a transfer direction of the shreds and conveys both of the shreds and the trimmings toward the defibrating unit, the pipe having a first end connected to the defibrating unit and a second end from which both of the shreds and the trimmings enter into the pipe,
the defibration capacity, which is the amount defibrated per unit time by the defibrating unit, being greater than or equal to the shredding capacity, which is the amount shredded per unit time by the shredder,
the defibration capacity being greater than or equal to the sum of the amount passing through the second conveyance path per unit time and the shredding capacity.

3. A feedstock defibrating apparatus comprising:
a shredder including blades that cut and separate feedstock containing at least fiber into shreds in air;
a defibrating unit that defibrates the shreds in air;
a separator that separates the defibrated material into passed material that passes through multiple apertures, and remnants that do not pass;
a first conveyance path that conveys the remnants toward the defibrating unit; and
a pipe that is arranged downstream relative to the shredder and upstream relative to the defibrating unit in a transfer direction of the shreds and conveys both of the shreds and the remnants toward the defibrating unit, the pipe having a first end connected to the defibrating unit and a second end from which both of the shreds and the remnants enter into the pipe,
the defibration amount processed per unit time by the defibrating unit being greater than or equal to the shredding amount processed per unit time by the shredder,
the defibration capacity being greater than or equal to the sum of the amount passing through the first conveyance path per unit time and the shredding capacity.

* * * * *